United States Patent [19]
Perlman

[11] 3,716,369
[45] Feb. 13, 1973

[54] PROCESS FOR COOKING FOODS IN POLYALKYLENE TERAPHALATE FILM BAG

[76] Inventor: Sol J. Perlman, 150 West Ostend St., Baltimore, Md. 21230

[22] Filed: Aug. 5, 1970

[21] Appl. No.: 61,049

Related U.S. Application Data

[63] Continuation-in-part for Ser. No. 842,570, July 17, 1969, Pat. No. 3,578,239, which is a continuation-in-part of Ser. No. 630,961, April 14, 1967, Pat. No. 3,478,952.

[52] U.S. Cl. ................................. 99/1, 99/171 H
[51] Int. Cl. ..................................... B65b 25/22
[58] Field of Search .99/171 H, 174, 1, 171 S, 171 C, 99/171 LP; 229/53, 48 T, 48 SB, 57; 206/46 F, 57 A, 65 S; 161/147

[56] References Cited

UNITED STATES PATENTS

| | | | |
|---|---|---|---|
| 3,262,787 | 7/1966 | Ellis | 99/171 LP X |
| 3,204,760 | 9/1965 | Whiteford | 229/48 T X |
| 3,132,029 | 5/1964 | Beck | 99/171 H X |
| 3,108,881 | 10/1963 | Shaw et al. | 99/17 H UX |
| 3,008,837 | 11/1961 | Kaplan | 99/17 H X |

FOREIGN PATENTS OR APPLICATIONS

| | | | |
|---|---|---|---|
| 703,413 | 2/1965 | Canada | 99/171 H |

*Primary Examiner*—Frank W. Lutter
*Assistant Examiner*—Steven L. Weinstein
*Attorney*—Cushman, Darby & Cushman

[57] ABSTRACT

A process for cooking foods in polyalkylene terephthalate film bags is disclosed, wherein at least one side or bottom of such bags is formed by two distinct adhesive bands. The inner band is a thermoplastic adhesive which allows a measure of "peelability" and "shock absorbability," whereas the outer adhesive band is a high strength thermosetting adhesive. During the cooking process the side of the bag having the adhesive bands will open to the atmosphere.

9 Claims, 3 Drawing Figures

PATENTED FEB 13 1973 3,716,369

INVENTOR
Sol J. Perlman
BY Cushman, Darby & Cushman
ATTORNEYS

PROCESS FOR COOKING FOODS IN POLYALKYLENE TERAPHALATE FILM BAG

CROSS-REFERENCE TO RELATED APPLICATIONS

This application is a continuation-in-part of my copending application Ser. No. 842,570, filed July 17, 1969, now U.S. Pat. No. 3,578,239, which was a continuation-in-part of application Ser. No. 630,961, filed Apr. 14, 1967, now U.S. Pat. No. 3,478,952.

BACKGROUND OF THE INVENTION

Polyalkylene terephthalate films have been known to the prior art, and have previously been used for packaging applications. With the term "polyalkylene terephthalate" is used in the present specification, it is to be understood to apply to polymeric linear terephthalate esters formed by reacting a glycol of the series $$HO(CH_2)_nOH$$

wherein $n$ is an integer of 2 to 10, inclusive, with terephthalic acid or a lower alkyl ester of terephthalic acid, wherein the alkyl group contains one to four carbon atoms, such as, for example, dimethyl terephthalate. The preparation of polyalkylene terephthalates is disclosed in U.S. Pat. No. 2,465,319 to Whinfield and Dickson, the disclosure of which is hereby incorporated by reference. The most widely used and commercially attractive polyalkylene terephthalate material in the United States is polyethylene terephthalate, such as the product sold under the commercial trade name "Mylar." Polyethylene terephthalate is generally produced by an ester interchange between ethylene glycol and dimethyl terephthalate to form bis-2-hydroxy ethyl terephthalate monomer, which is polymerized under reduced pressure and elevated temperature to polyethylene terephthalate. The alkylene terephthalate polyesters may be readily formed into films, for example, by melt casting or by tubular blown film extrusion.

The polyalkylene terephthalate films which are used in the shrink packaging field are films which have been oriented and heat set at elevated temperatures and restrained shrinkage. Polyethylene terephthalate film in substantially amorphous form may be oriented, for example by stretching the film substantially equally in both linear directions, generally about 2- to 3¼-fold. Generally, heat setting of the film is accomplished after the orientation and is accomplished while maintaining the film under tension at a temperature above 100°C. Poly alkylene terephthalate films which are not heat shrinkable also find application in the packaging field.

The polyester films produced from polyalkylene terephthalates are not "heat sealable," in the sense that that term is used in the packaging field. The adhesive force developed between contacting layers of the polyester film during heat sealing treatments is not of sufficient strength for packaging applications. However, it should be realized that the polyalkylene terephthalate films might be classified as heat sealable for other applications wherein different requirements prevail.

The prior art has produced polyalkylene terephthalate film bags for packaging applications by simultaneously applying the bottom seal adhesive and the longitudinal (back or side) seal adhesive to a flat sheet of the plastic film. The film sheet is then folded and thus adhered into the desired bag shape. Prior art polyalkylene terephthalate adhesives are disclosed by, for example, U.S. Pat. Nos. 2,820,735, 2,961,365, and 3,022,192, the disclosures of which are hereby incorporated by reference. It is known to use a thermoplastic adhesive alone on the bottom of the bag and a thermosetting adhesive alone to form the longitudinal back seal of the bag. Due to the use of the thermoplastic adhesive alone on the bottom of the bag, the packager must reverse, e.g., turn inside out, the bag in order to obtain adequate bottom seam strength, which is an extra step. The use of thermosetting adhesives alone on the bottom seal of such bags proved commercially unsatisfactory for two major reasons. First, the film was subjected to failure because of poor shock absorbing characteristics. In packaging, the product is generally rammed into a bag and such bags had insufficient bottom edge "shock absorbability" and/or "peelability." By "peelability" is meant the ability of the adhesive to allow at least a portion of the polyalkylene terephthalate films at the adhered band to separate from one another without film tear. Second, after the product is placed in the polyester bag and the bag is closed at the top, the film may be heat shrunk upon the contained article. The shrinking cycle develops quite high stresses in polyalkylene terephthalate films and has caused the prior art bags to tear when the adhesive had insufficient peelability.

Heat shrinkable polyalkylene terephthalate film is a biaxially oriented film exhibiting very high shrink energies of at least 700 psi, and usually 1,000 psi or above, preferably about 1,700 psi, or even higher. Such films have been previously used in shrink packaging. The properties of shrink packaging polymeric films is discussed by Robert D. Lowry in "The Growth of Shrink Packaging," Modern Packing Encyclopedia, pages 288 to 296, 1963, the disclosure of which is hereby incorporated by reference.

The polyalkylene terephthalate film bags produced by known methods have not been able to be used for cooking a contained food product, as the thermosetting adhesives did not have the requisite degree of "peelability" to withstand the resultant high film stresses, and the thermoplastic adhesives lost too much strength at the cooking temperatures. In general, an extended heating cycle at temperatures of 210°F. or above have caused failure in the known shrink packaged polyalkylene terephthalate film bags.

BRIEF DESCRIPTION OF THE INVENTION

Polyalkylene terephthalate film bags may now be used in cooking applications, if the bags are constructed with at least one edge having two adhesive bangs, with the outer band, e.g., the band closest to the outer edge of the bag, being a thermosetting adhesive and the inner band, which may be adjacent the outer band or may spaced therefrom, being a thermoplastic adhesive. The outer thermosetting adhesive imparts the required strength and heat resistance to the adhered section or band, while the inner, thermoplastic adhesive imparts a desired degree of "peelability," which allows the bag to absorb shock.

DESCRIPTION OF THE DRAWINGS

The invention will be more readily understood with reference to the accompanying set of drawings, wherein

In FIG. 1, a polyalkylene terephthalate bag 1 is shown which comprises a top 3 and a bottom 2. The bag is illustrated as formed from a tubular portion of polyalkylene terephthalate film, although the present commercial bags are formed from a flat piece of film by making a suitable longitudinal seam, as known of the art. The bottom of the bag is sealed by an outer adhesive layer 4 and an inner adhesive layer 5. The adhesive bands are shown as being separated from one another, but they may, if desired be adjacent to each other.

In FIG. 2, the bag 1 is shown in cross-section. Polyalkylene terephthalate film tube 6 is closed at one end (the bottom end) by means of an inner adhesive band 5 and an outer adhesive band 4 (not shown).

In FIG. 3, another polyalkylene terephthalate bag 7, comprising a folded film 8, is shown. The fold of the film forms a bottom edge 9, and the side edges 10 are formed by adhering the film to itself with an outer adhesive layer 4 and an inner adhesive layer 5.

Figure 1:
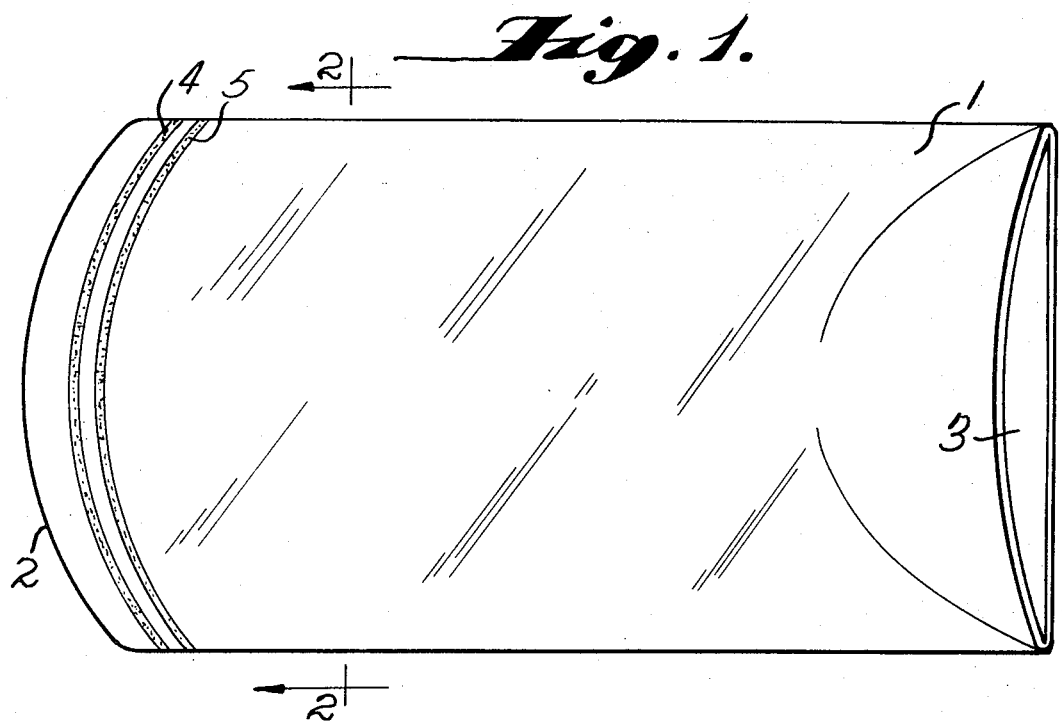
FIG. 1 represents a side view of the polyalkylene terephthalate bag of the invention.
Figure 2:
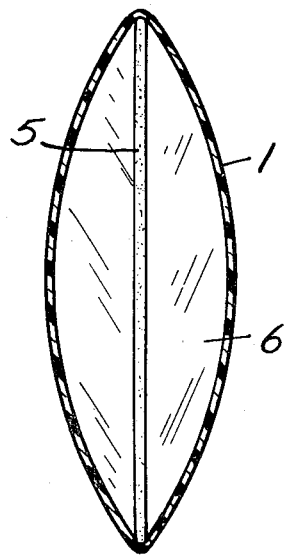
FIG. 2 represents a cross-section of the bag of FIG. 1, taken along the line 2—2.

GENERAL DESCRIPTION OF THE INVENTION the polyalkylene terephthalate film bags of the present invention exhibit greatly reduced tendencies to tear and otherwise be adversely affected by mechanical shock and stresses caused by loading the product into a bag, or by heat shrinking the bag around the contained product, or by subjecting the bag to extended heat treatment, such as, for example, subjecting the packaged product to immersion in boiling water to cook the contained product.

The key to the successful performance of the bags produced by the present invention resides in the "-peelability" of the inner adhesive band and the high heat resistance and high cohesive strength exhibited by the outer adhesive band.

The inner thermoplastic adhesive band functions to absorb shocks imparted to the adhesive band and the outer thermosetting adhesive band functions to provide an adhesive area of high cohesive strength and high heat resistance. These bands may be of any desired width, and may be adjacent one another or spaced apart from each other. In the case of polyalkylene terephthalate film bags suitable for the packaging of frozen turkeys, it is preferred to use a ⅜- inch wide laydown of each adhesive layer and to have no space between the layers, e.g., the layers are adjacent. Generally, each adhesive layer or band will be at least one-eighth inch wide.

Polyalkylene terephthalate films are known to have high tensile strength but their tear resistance when subjected to shock, especially in the machine direction of extruded film, is low. Therefore, the adhesive utilized must be capable of exhibiting a shock-absorbing ability during a heat shrinkage cycle, for otherwise the film will tear due to the high stresses involved.

The adhesive bands may be applied by any of the methods known to the art. For example, they may be applied by brushes or a flexographic press. Four rolls may be used to transfer the adhesive to a desired bag pattern. For instance, for round bottomed bags it has generally been desired to apply the adhesive in a sine curve laydown, whereas a straight laydown is generally used for flat bottomed bags. Other bag shapes and adhesive laydown patterns may be used in the practice of the present invention. It will be readily be appreciated that the bags produced according to the present invention need not be reversed before packaging, as normally done, thereby allowing the bag to be printed on its outer surface either before or after the application of the adhesive layers.

After the bags are manufactured, the product may be loaded through the open end, and the bag then air evacuated and closed, for instance, by means of a metal or plastic clip, as known to the art, and then, for heat shrinkable films, the bag may be shrunk upon the contained product, for instance by immersion in hot water baths, e.g., at 210°F. As mentioned, it is possible to cook food for any necessary length of time while the food is contained in the present bag. Polyethylene terepthalate films generally melt at a temperature of about 425° to 450°F. and generally the cooking temperatures should not be higher than 350°F. The ability to cook shrink packaged food products in polyalkylene terephthalate bags is unique, as far as known, to the bags produced by the present invention.

A wide variety of adhesives may be used in the practice of the present invention. The inner, thermoplastic adhesive may be any thermoplastic adhesive which exhibits adhesive characteristics to polyalkylene terephthalate films. Particularly preferred thermoplastic polyester adhesives, for example, are described in the Chapman U.S. Pat. No. 3,142,434, the disclosure of which is hereby incorporated by reference. Among other thermoplastic adhesives may be mentioned, by way of example, and not of limitation, the polyamide adhesives disclosed in U.S. Pat. No. 2,379,413, especially those of molecular weights of 6,000 to 9,000 and produced by the reaction of dimerized linoleic acid and ethylene diamine. Other thermoplastic adhesives for polyalkylene terephthalate are known to the art and may be utilized.

The outer thermosetting adhesive is generally a two component, or two can, system. Polyurethane and polyester adhesives are particularly preferred, but any of the thermosetting adhesives for polyalkylene terephthalate films known to the art may be utilized. In general, the amount of catalyst when utilized in such a system must be closely watched in order to avoid gellation in the equipment involved. It is generally preferred to cure the thermosetting resin at a quite low rate. If desired, a modified isocyanate curing agent may be added to polyester adhesives.

As a polyester adhesive there may be used, for instance, a styrene-modified polyethylene glycol polypropylene glycol adipate-maleate, as is known to the art. The selection of a proper catalyst for any given thermosetting polyalkylene terephthalate film adhesive is within the skill of those in the art.

The invention will be understood more readily by reference to the following examples; however, these examples are intended to illustrate the invention and are not to be construed to limit the scope of the invention.

EXAMPLE 1

Two adhesive bands were applied by way of a flexographic press to oriented heat shrinkable polyethylene terephthalate film 0.00065 inches thick, in a contour to give a round-bottom bag with a longitudinal center seal in one side. The inner band was three-eighths of an inch thick and was the polyester adhesive sold under the identification "469 68 polyester" by duPont (produced by the process of U.S. Pat. No. 3,142,434). The outer adhesive was a thermosetting adhesive, based on a polyurethane resin. This was a two-part adhesive system under the designation 712–602 and 713–806. The 712–602 material is a polyol composition exhibiting a Brookfield viscosity at 77°F. of 400–600 cps at 25 percent solids in methyl ethyl ketone. The 712–806, which was used in an amount corresponding to 5 percent by weight of the 712–602, was a polyurethane prepolymer which was a 75 percent solid solution in methyl ethyl ketone, exhibiting a viscosity of that medium syrup. After 5 days aging at room temperature to ensure cure of the adhesive band, the bag, which was of 16-inch lay flat width, was loaded with a turkey, vacuum evacuated and the open end was sealed by a metal clip. The bag was immersed in a hot water bath (at 180°F.) for 5 minutes thereby causing the film to shrink around the turkey. The packaged turkey was then frozen.

EXAMPLE 2

The frozen packaged turkey produced according to Example 1 was cooked in a pressure cooker at 250°F. for 3 hours, until done. Examination of the polyethylene terephthalate film showed no rips or tears in the bag and a tight adhesive band. Because of the presence of the polyethylene terephthalate film bag, the turkey was steamed in its own juices.

EXAMPLE 3

Example 1 was repeated except different adhesives were used. The inner, thermoplastic adhesive was prepared as follows: 30 parts of a copolyester having a relative viscosity of 1.6 prepared by reacting ethylene glycol with 33 mol percent dimethyl terephthalate, 17 mol percent dimethyl isophthalate and 50 mol percent dimethyl sebacate under ester-interchange conditions followed by polymerizing, were stirred together with 4.5 parts of triethyl citrate, 1.5 parts of "Syloid" 162 silica (10 micron silica, Davidson Chem, W. R. Grace Co.) and 0.45 part of lauryl alcohol into a volatile organic solvent mixture consisting of 32.9 parts of methyl ethyl ketone, 3.5 parts of methyl isobutyl ketone and 21 parts of xylene.

The outer thermosetting adhesive was a two-can polyurethane adhesive. One component consisted of a urethane prepolymer of toluene diisocyanate and a mixture of trimethylol propane and diethylene glycol adipate, the mixture having hydroxyl functionality of 2.5. The prepolymer contained 28 percent free NCO. The second component of the two-can polyurethane adhesive was a polyol composition containing the reaction product of pentaerythritol with 5 moles of propylene oxide, together with triethylene diamine catalyst. The two components of the polyurethane adhesive were used in a proportion to give a final NCO:OH ratio of 1.05:1.0. The triethylene diamine was present in an amount equal to 0.5 percent by weight of the total adhesive composition.

The packaged turkey was examined after freezing and after cooking and the polyethylene terephthalate film exhibited no signs of rips or tears, and the outer adhesive band remained intact. Again, the turkey was steamed in its own juices.

EXAMPLE 4

Example 3 was repeated but in place of the polyurethane thermosetting adhesive was used a polyester thermosetting adhesive which was a styrene-modified polyethylene glycol-polypropylene glycol adipate-maleate. THe final product produced by this example was similar to the product of Example 3.

EXAMPLE 5

A frozen shrink-packaged 10-pound turkey produced according to Example 1 was roasted in an oven at 350°F. for about 3 or 3½ hours, until done. When the turkey appeared to be thawed, the bag adhesive seal separated, due to the combined effect of increased internal pressure and exposure to elevated temperature, allowing the moisture vapor inside the bag to escape (as otherwise the turkey would have been steamed, like the preceding examples). However, the polyethylene terephthalate film bag retained an appreciable amount of the natural juices of the turkey, and in effect the turkey was self-basting.

EXAMPLE 6

Example 5 was repeated, except that the turkey was not frozen. The same general results were obtained, except that the cooking time was reduced to about one half hour.

EXAMPLE 7

A three rib standing rib roast was packaged in the polyethylene terephthalate film bag of Example 1, and was then frozen. The frozen shrink-packaged roast was placed an oven at 350°F., and roasted until done to the desired degree. After the roast appeared to be generally thawed, the bag adhesive seal separated, with the release of interior moisture vapor. the roast appeared to be essentially self-basting, and was quite juicy and tender.

EXAMPLE 8

Unoriented polyethylene terephthalate film 0.00065 inch thick, was folded on itself, and then the two sides next to the fold were adhered with the two band adhesive system and band widths of Example 1, to form a flat bottom bag of 16 inches lay flat width. The bag had the appearance of FIG. 3. The oriented, heat shrinkable, polyethylene terephthalate films used in Examples 1–4, exhibit considerable shrinkage in dimensional stability tests. The dimensional stability test comprises subjecting unrestrained film to immersion in water at 100°C. for 5 seconds. The heat shrinkable polyethylene terephthalate films shrink about 45 percent in the machine direction and about 50 percent in the transverse direction under these test conditions. In distinct contrast, the unoriented polyethylene terephthalate film used in this example exhibited no shrinkage in the dimensional stability test.

In a preferred form of the invention, the polyalkylene terephthalate film bag is heat sealed at the adhesive band to reduce the peelability of the thermoplastic adhesive. Such heat treated, or heat sealed, adhesive bands allow the production of bags which can withstand greater shocks.

The polyalkyelene terephthalate film bags of the present invention are preferably used to package food products, most preferably turkeys, but it is to be understood that these bags may be used to package a wide variety of other items as well. Other food products which may be packaged in the bags of this invention include other types of poultry, beef, ham, veal, mutton and lamb, and the like. When food items are packaged within the bags of the present invention, the food may be cooked in the bag itself, for example, by immersion in boiling water or by roasting or by use of a pressure cooker. In general, the cooking cycle will be at a temperature of about 210°F. to 350°F. and for at least 10 minutes and until the product is cooked.

The polyalkylene terephthalate films used in the practice of the present invention are preferably heat shrinkable films with the high shrink energies of at least 700 psi. However, it is to be understood that bags may be produced from film which has not been biaxially oriented, in which case the unoriented film will exhibit little or no heat shrink property.

Figure 3:
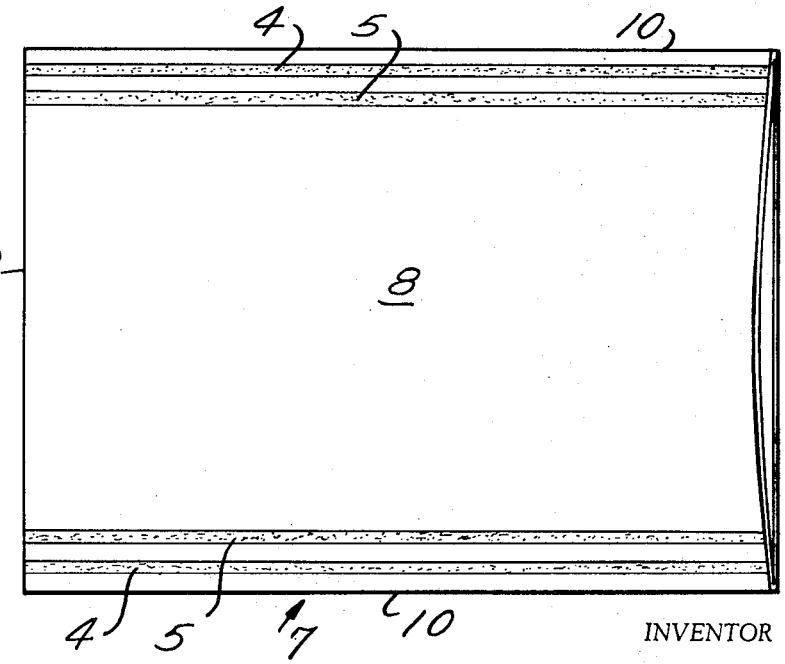
FIG. 3 represents a side view of another embodiment of the invention.

It is preferred that the bags be produced from tubular film, with the two band adhesive system adhering the film to itself to form the bag The the bag may be produced from a folded sheet of film wherein the fold forms one side of the bag. However, it is to be understood that the bag may be produced from folded film wherein the fold forms the bag bottom and the sides are adhered, such as illustrated in FIG. 3, or both sides and the bottom may be formed by adhering the film layers with the two-band adhesive system of the present invention.

I claim:

1. A process for cooking a food item while said food item is contained in a plastic film bag, said process comprising the steps of inserting said food item in a heat shrinkable polyalkylene terephthalate film bag having at least one edge of said bag formed by adhering the polyalkylene terephthalate film to itself by the combination of (1) an inner band of thermoplastic polyalkylene terephthalate film adhesive and (2) and outer band of thermosetting polyalkylene terephthalate film adhesive, thereafter closing the bag and then shrinking the bag upon the contained food item, and thereafter cooking the food item contained in said plastic bag at a temperature of about 350°F until the food item is cooked, thereby permitting said edge of said bag to open to the atmosphere during the cooking cycle.

2. The process as claimed in claim 1, wherein said food item is frozen after said bag has been shrunk upon the contained food item.

3. The process as claimed in claim 2, wherein said food item is subjected to said cooking temperature while still frozen.

4. The process as claimed in claim 1, wherein said polyalkylene terephthalate film bag is an oriented heat shrinkable polyalkylene terephthalate film bag.

5. The process as claimed in claim 4, wherein at least the bottom portion of said bag is formed by adhering the polyalkylene terephthalate film to itself.

6. the process as claimed in claim 4, wherein said polyalkylene terephthalate is polyethylene terephthalate.

7. The process as claimed in claim 6, wherein each adhesive band is at least about one-eighth inch wide.

8. The process as claimed in claim 7, wherein each adhesive band is about three-eights inch wide.

9. The process as claimed in claim 7, wherein said adhesive bands are in adjacent position.

* * * * *